G. A. SPENCER.
ROTARY SPRING FITTING MACHINE.
APPLICATION FILED MAY 11, 1916.
1,219,876.
Patented Mar. 20, 1917.
2 SHEETS—SHEET 1.
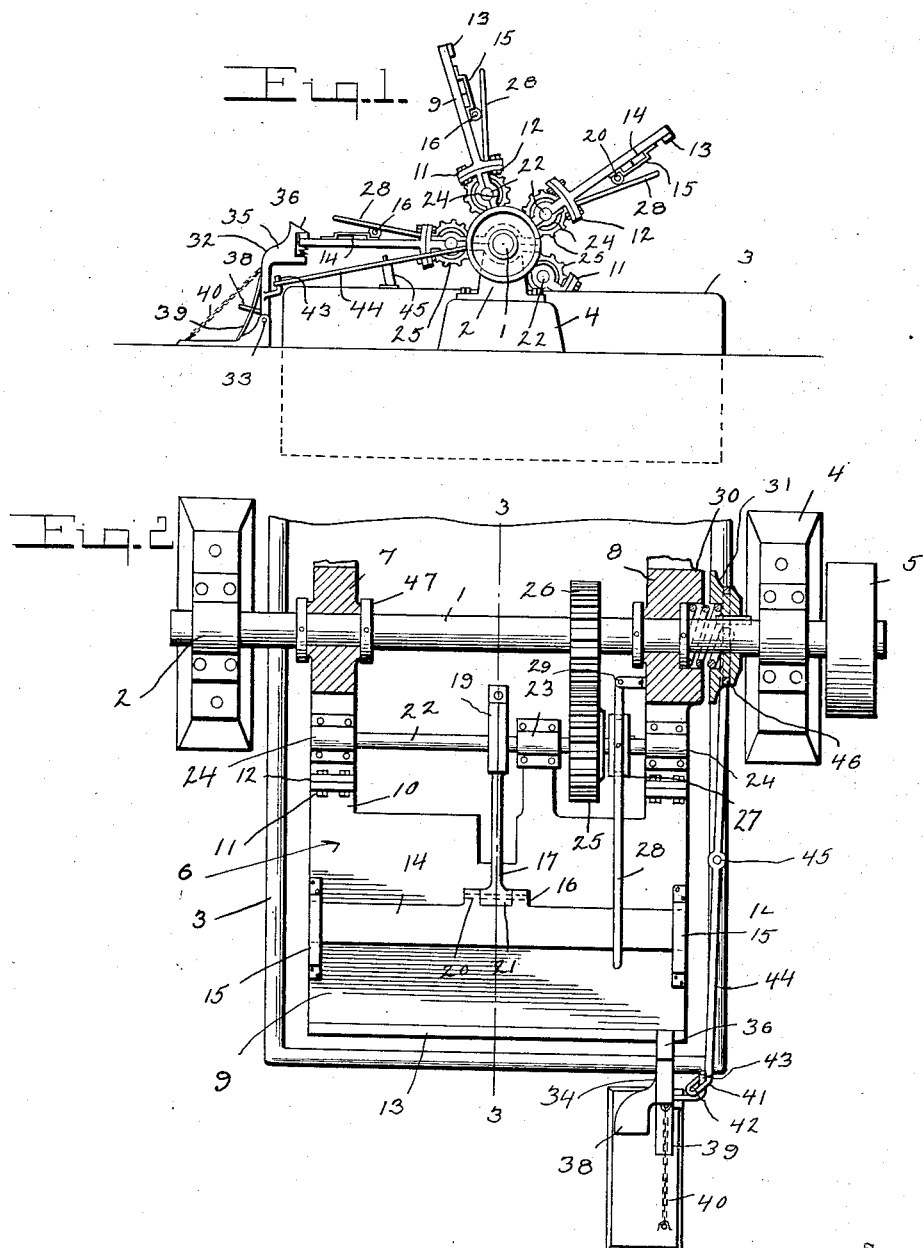
Witnesses
Inventor
G. A. Spencer
By
Attorney

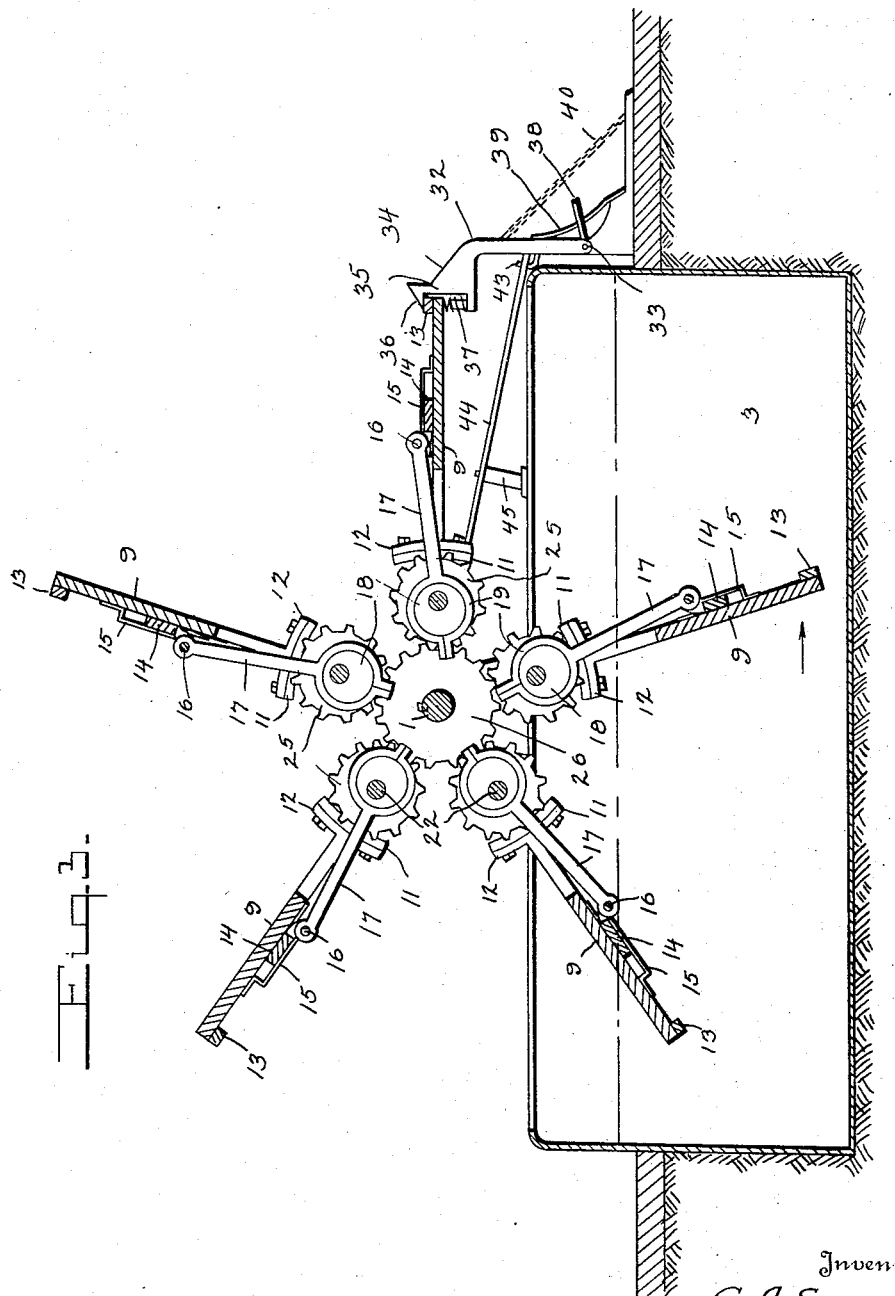

UNITED STATES PATENT OFFICE.

GEORGE A. SPENCER, OF JACKSON, MICHIGAN, ASSIGNOR OF ONE-THIRD TO IDA GLENN, OF JACKSON, MICHIGAN.

ROTARY SPRING-FITTING MACHINE.

1,219,876.  Specification of Letters Patent.  Patented Mar. 20, 1917.

Application filed May 11, 1916. Serial No. 96,957.

*To all whom it may concern:*

Be it known that I, GEORGE A. SPENCER, a citizen of the United States, residing at Jackson, in the county of Jackson and State of Michigan, have invented certain new and useful Improvements in Rotary Spring-Fitting Machines; and I do hereby declare the following to be a full, clear, and exact description of the invention, such as will enable others skilled in the art to which it appertains to make and use the same.

The invention relates to a machine for bending and tempering automobile and various other vehicle springs and to provide a simple, practical and comparatively inexpensive rotary machine of this character adapted to enable the work of bending and tempering vehicle springs to be rapidly and easily performed and having its parts conveniently arranged for placing the springs in and removing from the machine.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings—

Figure 1 is an end elevation of a rotary spring fitting machine constructed in accordance with this invention, Fig. 2 is a plan view of the same partly in section, Fig. 3 is a vertical sectional view of the rotary spring fitting machine taken substantially on the line 3—3 of Fig. 2.

Like numerals of reference designate corresponding parts in the several figures of the drawings.

In the accompanying drawings in which is illustrated the preferred embodiment of the invention, the rotary spring fitting machine comprises in its construction a main horizontally disposed shaft 1 journaled in suitable bearings 2 located at opposite sides of an oil tank 3 and mounted upon concrete posts 4 or other suitable supports. The shaft is of a length to extend across the tank and it is equipped at one end with a pulley 5 designed to be connected by a belt with any suitable source of power but any other suitable means may be employed for rotating the main shaft which constitutes an axle for a rotary carrier 6. The rotary carrier 6 comprises in its construction hub sections 7 and 8, which are loosely mounted on the shaft 1, and a plurality of radially arranged tables 9 having arms 10 which are secured to the hub sections 7 and 8. The arms 10 and the hub sections are provided with attaching flanges 11 and 12 which are bolted or otherwise secured together. The tables which are rectangular are preferably five in number to enable two of them to be submerged in the tank and three of them to be located exteriorly of the tank as clearly illustrated in Fig. 3 of the drawings but any other desired number of tables may of course be employed. The tank is designed to contain oil for tempering the springs but water or any other tempering medium may of course be employed. Each table is equipped at the outer portion with a transverse flange 13 constituting a stop and coöperating in bending a spring with a slidable plunger 14 consisting of a plate or member mounted in side guides 15 and pivoted by a pin 16 to an eccentric rod 17. The plunger is moved outwardly and inwardly by an eccentric 18 on which is arranged a strap or band 19 that is connected to the inner end of the eccentric rod 17. The eccentric is rotated one-half a revolution at each operation to extend and withdraw the plunger 14 which is adapted to open and close the forms ordinarily employed in the bending and tempering of the parts of automobile and other vehicle springs. As the ordinary form usually employed is used illustration of such form is deemed unnecessary. The transverse pintle 16 is mounted in eyes 20 and 21 of the inner edge of the table plunger and the outer end of the eccentric rod 17. An eccentric is provided for each table and is mounted on a horizontal shaft 22 and the shaft of each table is journaled in a central bearing 23 of its table and end bearings 24 of the hub sections of the rotary carrier and each shaft of the radially arranged tables has loosely mounted on it a gear wheel 25 which meshes with a main driving gear wheel 26 mounted on the central shaft or axle 1 and imparting continuous rotary movement to the gear wheels of the radially arranged tables when the central shaft or axle is rotated. Each of the transverse eccentric actuating shafts is equipped with a slidable clutch member 27 interlocked with the shaft 22 and movable along the same into and out of engagement with the gear 25 and when the movable clutch section is carried into engagement with the gear wheel 25 the shaft 22 with which the said clutch section is slidably interlocked will be rotated and motion will be transmitted to the eccentric for moving the plunger 14 inwardly or outwardly. The clutch section 27 which has an annular groove to receive the fork of an operating lever 28 is actuated by the latter and the said lever 28 which is fulcrumed at its inner end at 29 on a projection of the hub section 8 extends forwardly and outwardly and is arranged within easy reach of the operator standing at the front of the table. The hub section 8 of the rotary carrier is provided at its outer face with an enlargement 30 forming a clutch face which is adapted to be engaged by a slidable clutch section 31 which is slidably interlocked with the main shaft or axle 1 whereby the rotary carrier will be rotated when the slidable clutch section or member 31 is moved into engagement with the clutch face 30 of the said section 8.

The clutch for operating the rotary carrier is preferably a friction clutch but the clutches of the tables for transmitting motion to the plungers may be of any desired type. The slidable clutch member is moved into engagement with the clutch face of the enlargement 30 and held in such engagement by the means hereinafter explained until the table begins to rotate and its momentum will then be sufficient to carry the machine forward for advancing the next table to the front where it is held in a horizontal position by a locking device 32. The carrier with its radially arranged tables rotates in a direction to carry the lowermost tables from front to rear and the locking device consists of an arm or lever pivoted at 33 and having a head 34 extending forwardly and located in the path of the free outer edges of the tables. The head 34 is provided at the engaging portion with a recess 35 and it is beveled at 36 above the recess to enable a table to contact with the beveled face and move the locking device outwardly and pass into engagement with the recess 35. The recess 35 receives a coiled cushioning spring 37 which checks the rotary movement of the table and cushions the same and gently returns the table to a position in engagement with the upper wall of the recess 35. A foot pedal 38 is connected with the arm or lever of the locking device and the latter is urged into engagement with the tables by a spring 39 and is limited in its inward movement by a chain 40 or other suitable limiting device. The foot pedal 38 is adapted to be depressed to withdraw the locking device from engagement with the front edge of the front table and the locking device is also provided with an arm 41 which extends into slot 42 of a laterally extending portion 43 of a shifting lever 44 fulcrumed intermediate of its ends at 45 and provided at its inner or rear portion with a fork 46 that is connected with the slidable clutch section or member of the main or centrally arranged shaft or axle 1. When the foot plate or pedal is depressed to withdraw the catch or engaging portion of the locking device 32 from engagement with the front horizontally disposed table the slidable clutch member, which is connected with the said foot plate or pedal, will be automatically moved into engagement with the clutch face of the hub section 8 and rotary motion will be imparted to the rotary carrier and when the foot plate or pedal is released the clutch section will be moved out of engagement with the hub section 8 by a coiled spring which assists the action of the spring of the locking device.

The spring fitting machine is located partly below the floor level and the front table which is supported in a horizontal position is located within convenient reach of the operator. Two of the radially arranged tables are submerged in the tank when the front table is in a horizontal position and three of the tables are located exteriorly of the tank and it will be clear that the work of bending and tempering of springs for automobiles and various other vehicles and analogous purposes may be easily and rapidly performed. In fitting springs which is tempering the springs while the same are in a heated condition and are bowed or bent, the springs are placed in the form at a red heat. Such a form with the spring contained therein is placed on the front table, which is maintained in a horizontal position by the catch. The lever 28 is then operated to move the plunger to close the form and bend the spring. The foot treadle or pedal is then depressed to release the table at the front of the machine and to move the sliding clutch member 31 into engagement with the adjacent hub section 8. This will cause the carrier to be rotated by the shaft 1. The carrier is permitted to rotate a sufficient distance to submerge the table carrying the heated spring and to carry the previously submerged table at the back of the tank upwardly out of the liquid. By this operation the tables are successively brought to the front and are supplied with springs and carried through the oil or other tempering liquid and are lifted out of the oil. The springs may be left in the oil the desired length of time, and in the operation of the machine may return to the front of the same so that they are placed in and removed from the machine at the same point.

The rotary carrier is held against movement longitudinally of the central shaft or axle by suitable set collars 47.

What is claimed is:—

1. A machine of the class described including a central horizontal shaft, a rotary carrier mounted on the shaft and provided with a plurality of radially arranged tables, revolving transverse shafts located at the said tables and spaced from the central shaft, a main driving gear mounted on the central shaft, gears arranged on the revolving shaft and meshing with the central gear, reciprocatory plungers carried by the said tables and means operated by the said gearing for actuating the said plungers.

2. A machine of the class described including a central horizontal shaft, a rotary carrier mounted on the shaft and provided with a plurality of radially arranged tables, revolving transverse shafts located at the said tables and spaced from the central shaft, a main driving gear mounted on the central shaft, gears arranged on the revolving shaft and meshing with the central gear, reciprocatory plungers carried by the said tables, and eccentrics mounted on the revolving shaft and having rods connected with the plungers.

3. A machine of the class described including a central transverse shaft, a rotary carrier comprising hub sections mounted on the said shaft and radially arranged tables connected with the hub sections, said hub sections being also provided at the tables with opposite bearings, transverse shafts journaled in the said bearings and revolving with the rotary carrier, a main gear mounted on the central shaft, gear wheels loosely arranged on the other shaft, clutches for connecting the gear wheels with the revolving transverse shaft, plungers carried by the tables and eccentrics mounted on the transverse shafts and having eccentric rods connected with the said plungers.

4. A machine of the class described including a rotary carrier provided with radially arranged tables, and a locking device for holding the carrier against movement, said locking device including a pivoted lever having a head for engaging one of said tables, cushioning means arranged on the head and arranged to check the rotary movement of the carrier, a pintle connected with the locking device, a spring for urging the locking device toward the carrier and means for limiting the movement of the locking device.

5. A machine of the class described including a central shaft or axle, a rotary carrier mounted on the shaft or axle and provided with tables, a locking device for holding the carrier against movement, a clutch for connecting the carrier with the shaft for rotating the said carrier, a pedal connected with the locking device and provided with an arm, a clutch lever connected with the said clutch and having a portion connected with the arm of the said pedal whereby when the pedal is operated the shifting lever will be actuated.

In testimony whereof I affix my signature in presence of two witnesses.

GEORGE A. SPENCER.

Witnesses:
 DANIEL LANDON,
 RUDOLPH F. KRUGER.

Copies of this patent may be obtained for five cents each, by addressing the "Commissioner of Patents. Washington, D. C."